US004001591B2

United States Statutory Invention Registration [19]

[11] Reg. Number: H1591

Fulcher

[45] Published: Sep. 3, 1996

[54] PREPARATION OF FLAVOR-ENHANCED REDUCED CALORIE FRIED FOODS

[76] Inventor: John Fulcher, P.O. Box 35034, Dallas, Tex. 75235

[21] Appl. No.: 283,159

[22] Filed: Aug. 3, 1994

Related U.S. Application Data

[63] Continuation of Ser. No. 150,255, Nov. 10, 1993, abandoned, which is a continuation of Ser. No. 958,708, Oct. 9, 1992, abandoned.

[51] Int. Cl.[6] ..... A23D 9/06

[52] U.S. Cl. ..... 426/601; 426/613

[58] Field of Search ..... 426/501, 601, 426/613

[56] References Cited

U.S. PATENT DOCUMENTS

| | | | |
|---|---|---|---|
| 2,447,483 | 8/1948 | Baler et al. . | |
| 2,998,319 | 8/1961 | Babayan . | |
| 3,392,040 | 7/1968 | Kass . | |
| 4,436,786 | 3/1984 | Ohkawa et al. . | |
| 4,654,220 | 3/1987 | Heine et al. . | |
| 4,686,146 | 8/1987 | Karle et al. . | |
| 4,822,637 | 4/1989 | Chung et al. . | |
| 4,865,868 | 9/1989 | Kuss | 426/613 |
| 4,925,692 | 5/1990 | Ryan | 426/531 |
| 4,983,413 | 1/1991 | Meyer et al. . | |
| 5,080,921 | 1/1992 | Reimer . | |
| 5,082,864 | 1/1992 | Van den Oetelaar et al. . | |
| 5,104,678 | 4/1992 | Yang | 426/534 X |

FOREIGN PATENT DOCUMENTS 0205273 12/1986 European Pat. Off. .

OTHER PUBLICATIONS

Morehouse and Zabik, "Evaluation of Polydimethylsiloxane Fluids as Non–Caloric Frying Media", *J. Foodscience,* 54 (4) pp. 1061–1065 (1989).

Pomerantz, Y., "Functional Properties of Food Components", Academic Press, pp. 340 et seq., 1985.

Nawar, W. W., Chapter 9, "Thermal Decomposition of Lipids", *ACS Symposium Series 409: Thermal Generation of Aromas,* American Chemical Society 196th meeting, 1989 pp. 94–104.

Ho, C. T., et al., Chapter 10, "Contribution of Lipids to the Formation of Heterocyclic Compounds in Model Systems", *ACS Symposium Series 409: Thermal Generation of Aromas,* American Chemical Society 196th meeting, 1989 pp. 105–113.

Noll, W., *Chemistry and Technology of Silicones,* Academic Press, N.Y., 1968 pp. 471, 484.

Dialog Data Base, Base 51 (FSTA), Dialog Acc. No. 00386031, Abstracting "Flavored Vegetable Oils as a Substitute for Beef Tallow in Deep Frying Applications", *Food Technology,* 1989, 43(6), pp. 90–94.

*Primary Examiner*—Charles T. Jordan
*Assistant Examiner*—Chrisman D. Carroll

[57] ABSTRACT

The flavor of fried foods, such as potato chips, prepared in poly(dimethylsiloxane) fluid (silicone oil) is effectively enhanced when a flavor-enhancing component of animal or vegetable fats or oils is added to the silicone oil. Selected flavor-enhancing components include fatty acids, fatty acid esters, fatty alcohols, and mono- and di-glycerides. The flavor-enhancing component will be soluble in the silicone oil, and preferably will function to enhance flavor and aroma, as well as to reduce undesired foaming which can be associated with frying foods in silicone fluid.

27 Claims, No Drawings

PREPARATION OF FLAVOR-ENHANCED REDUCED CALORIE FRIED FOODS

This is a continuation of application Ser. No. 08/150,255, as filed Nov. 10, 1993, now abandoned which is a continuation of application Ser. No. 07/958,708, filed Oct. 9, 1992, now abandoned.

BACKGROUND OF THE INVENTION

1. Technical Field

The present invention relates generally to the preparation of reduced calorie fried foods, especially fried snack foods such as potato chips. More particularly, the invention relates to improvements in reduced-calorie fried foods which are prepared by frying in a silicone fluid. The inclusion in the silicone fluid of at least a minor amount of one or more flavor-enhancing additives that are constituents of naturally-occurring animal or vegetable fats or oils has been found to improve the deep-fat fried flavor and aroma of the fried foods. As an added benefit, the flavor-enhancing additive also will reduce foaming during frying.

2. Background Art

The preparation of fried foods in a medium other than naturally-occurring animal or vegetable fats and oils has long been viewed as advantageous from the standpoint of reducing the overall calorie content of the foods. In many fried snack foods, such as potato chips, the residual frying oil content of the finished product contributes more to the calorie content of the product than any other ingredient. As consumer trends place reduced-calorie or "light" foods in more and more favor, there remains a need to provide such foods so as to meet consumer demand.

The use of a frying medium which reduces the overall calorie content of fried foods has long been regarded as desirable. Fat contributes a variety of important functions as an ingredient in food products, however. Due to its excellent heat transfer properties, animal and vegetable fats and oils perform well as a cooking medium. While the ability to provide reduced-fat (and thus reduced-calorie food) products is of great commercial interest, the full commercial potential will not be realized unless the food products have a full complement of sensory characteristics (e.g. taste, texture and "mouthfeel") that are as good as, or nearly as good as, their higher-calorie, animal or vegetable fat-containing commercial counterparts.

The use of silicone fluid for the preparation of calorie-reduced fried foods has received considerable attention in the literature. Published European Patent Application 205,273 A2 (C. L. Frye, Dow Corning Corp., published Dec. 17, 1986) describes the use of silicone fluids as replacements for natural fats and oils in a variety of foods. Several examples in the publication illustrate the preparation of fried foods in silicone fluid.

Morehouse and Zabik (Evaluation of Polydimethylsiloxane Fluids as Non-Caloric Frying Media, J. Food Science, 54 (4), pp. 1061–65 (1989)) have identified 35 cSt (centistoke) polydimethylsiloxane as the most preferred frying media of the many viscosity grades of polydimethylsiloxane fluid which are available. Potato slices can be fried in 35 cSt polydimethylsiloxane with considerable foaming to make potato chips. These chips have good texture but lack the typical flavors associated with chips prepared in vegetable oils. Accordingly, chips prepared in silicone fluid received lower scores in taste panels than conventional chips.

U.S. Pat. No. 4,983,413 (Meyer et al., Jan. 8, 1991) also relates to the preparation of reduced-calorie foods by the incorporation of silicone fluids as replacements for natural fats or oils. Although potato slices can be fried in a 95:5% blend of dimethylpolysiloxane (350 cSt) and conventional frying oil, as stated in the patent, I have found that a 95% blend of polydimethylsiloxane fluid of 35 cSt viscosity and conventional frying oil foams unacceptably in frying. Thus, such a mixture of conventional frying oil and polydimethylsiloxane (35 cSt) appears relatively unsuitable for the preparation of fried foods.

Silicone fluid has many advantageous qualities as a prospective frying medium, including thermal stability and non-digestibility. Unfortunately, the fluid has an overall bland flavor in comparison to natural animal and vegetable fats traditionally used for preparing fried foods. Also, as mentioned earlier, silicone fluids tend to foam when used as a frying medium. Thus, improvements are needed to silicone fluid frying if food products prepared therein are to become commercially viable.

Accordingly, it is an object of the present invention to provide an improved method for preparing reduced-calorie fried foods. Such a method desirably takes advantage of the beneficial properties possessed by silicone fluid, while providing the desirable flavor notes and aromas traditionally associated with foods fried in naturally-occurring animal or vegetable fats or oils.

SUMMARY OF THE INVENTION

The foregoing and other objects have now been attained by the process of the present invention. In one aspect the invention provides a method of preparing a food product, comprising frying a food in a frying medium comprising poly(dimethylsiloxane) and flavor-enhancing component of a plant or animal fat or oil. The flavor-enhancing component should be present in an amount effective to impart to the cooked product a flavor and/or aroma normally associated with product fried in animal or vegetable fat or oil. Preferred flavor-enhancing components are constituents of (or chemically-modified derivatives of such constituents) animal or vegetable fats or oils, other than the triglyceride components of such fats or oils. Many such components are known in the trade as food-grade emulsifying agents and typically contain a fatty acid radical. While the effective amount of such flavor-enhancing component can vary from component to component, well less than 5% by volume (v/v) typically is needed to attain the desired fried food flavor notes in the food product. Less than 1% by volume and even less than 0.1% of some flavor-enhancing components (based on the volume of the silicone fluid) are effective to attain the desired characteristics in the end product.

It is generally understood that naturally-occurring animal and vegetable fats and oils are complex mixtures. It has now been discovered that although the triglyceride component of such fats and oils is substantially immiscible in poly(dimethylsiloxane), and tends to cause unacceptable foaming during frying if added thereto, other components of animal or vegetable (plant) fats and oils, as well as derivatives thereof, are reasonably soluble therein. These "flavor-enhancing components," when dissolved in poly(dimethylsiloxane) fluid, provide enhanced flavor and aroma which is reminiscent of natural oils and fats. Preferred flavor-enhancing components also function as surfactants to actually reduce the tendency of the silicone fluid to foam during the cooking process. Thus, a mixture of poly(dimethylsiloxane)

fluid and one or more flavor-enhancing component(s) of natural fats or oils provides an excellent medium for the preparation of reduced-calorie fried foods.

DETAILED DESCRIPTION OF THE PREFERRED EMBODIMENTS

In accordance with the present invention, a wide variety of fried foods are prepared by frying in a medium which comprises poly(dimethylsiloxane) fluid with a flavor-enhancing component derived from a plant or animal fat or oil dissolved therein. For the purposes of defining the "flavor-enhancing component," it is important to note that such term excludes naturally-occurring animal and vegetable fats and oils per se. More particularly, a "flavor-enhancing component" should be substantially free of both triglycerides and lecithin—two components of fats and oils that appear to promote foaming when present in silicone fluid frying medium. Thus, it can be said that a flavor-enhancing component consists essentially of one or more of the components enumerated herein, such as fatty acids, fatty acid derivatives, monoglycerides and diglycerides. Triglycerides and lecithin, if present in trace amount, should be present only to the extent that they do not contribute to foaming.

The use of poly(dimethylsiloxane) fluid in the preparation of fried foods is described in detail in Morehouse et al., referenced earlier and incorporated by reference herein. Poly(dimethylsiloxane) fluids with various viscosities are commercially available from Dow Corning Corp., Midland, Mich. Frying is conducted under typical frying conditions, for example at temperatures in the 180° to 190° C. range.

Poly(dimethylsiloxane) fluid of about 35 cSt viscosity presently is preferred for use in the present invention. This viscosity fluid provides frying rates similar to commonly used vegetable oils, such as soybean and cottonseed oils. Higher viscosity silicone fluids have been found to require longer frying times and thus are less preferred.

A variety of flavor-enhancing components of natural animal and vegetable fats and oils are suitable for use in accordance with the present invention. Those skilled in the art will recognize that, inasmuch as natural fats and oils are complex mixtures, there is no single component or set of components that can be unequivocally regarded as responsible for providing traditional "fried food" flavor notes and aroma. Rather, those of ordinary skill in this field will readily determine that many components of natural fats and oils are relatively soluble in poly(dimethylsiloxane) fluid. These soluble components are potentially suitable for use in the present invention.

Several flavor-enhancing components were tested for solubility at the 1% by weight level in poly(dimethylsiloxane). Linoleic acid (technical grade, Pfaltz and Bauer), soybean fatty acids (Witco Industrene 226 FG) and acylated monoglycerides (Myvacet) were found to be soluble at 25° C. Oleyl alcohol (Aldrich) was partially soluble at 25° C. but completely miscible at higher temperatures. Similarly, mono- and di-glycerides (DurEm 114K) were soluble at 60° C. and stearic acid (Sigma) was soluble at 180° C.

In general, fatty acids and food grade emulsifying agents containing fatty acid residues, such as monoglycerides and diglycerides, are preferred flavor-enhancing components for use in the present invention. These components are well known and characterized, and can be employed as an additive either in relatively pure form or as a component of a defined or somewhat undefined preparation. See, for example, the list of emulsifiers in U.S. Pat. Nos. 5,080,921 and 5,082,864 which are incorporated by reference herein. Also see the list of emulsifiers found in "Functional Properties of Food Components," Yeshajahu Pomerantz, Academic Press, pp. 340 et seq., 1985, also incorporated by reference herein. Other flavor-enhancing components, for the purposes of the invention, include monoglycerides, diglycerides, acylated monoglycerides and certain fatty acid esters including polyglycerol fatty acid esters. For example, fatty acids may be esterified with propylene glycol or sucrose.

The most preferred additives are the GRAS ("generally recognized as safe") oleic or linoleic acid esters, mono- and di-glycerides and fatty acids having iodine values (a measure of saturation) of > 85. Other preferred, but regulated additives, include polyol fatty acid esters, polyoxyethylene sorbitan fatty acid esters, acetylated mono- and di-glycerides, diacetyl tartaric acid esters of monoglycerides and citrate esters of monoglycerides having iodine values of about 30–85. Less preferred are lecithin and triglycerides, which have not been seen to reduce foaming of silicone fluid.

In addition to the naturally-occurring components of animal and vegetable fats and oils, it should thus be apparent that chemically-modified derivatives thereof are suitable for use in the present invention.

Preferred fatty acids include oleic and linoleic acids. (Stearic acid and derivatives thereof are useful to reduce foaming, but generally do not contribute to the fried food flavors which are desired.) The useful fatty acid derivatives include glycerol monooleate, glycerol monolinoleate, glycerol monooleate diacetate, glycerol monolinoleate diacetate, glycerol oleate linoleate acetate, oleyl alcohol, linoleyl alcohol, and oleic and linoleic esters of polyglycerols. The various flavor-enhancing components may be used alone or in various combinations, and are commercially available from a variety of sources.

Although flavor-enhancing materials are referred to herein as "components" of animal or vegetable fats or oils, the additives need not be purified from or obtained from such fats or oils. Synthetically-sourced additives as well as additives actually derived from naturally-occurring fats and oils are within the definition of "flavor-enhancing components" of the present invention.

In general, less than about 1.0% by volume (on a v/v basis based on the volume of silicone fluid) and preferably less than about 0.1% by volume of flavor-enhancing component is required in the poly(dimethylsiloxane) in order to realize improved fried food flavor notes and aroma in the final product. The optimal level of any particular component or combination of components will be routinely arrived at by those of ordinary skill in this field with due regard to flavor and surfactant properties. As shown herein, some additives are effective in the range of about 10 to 100 parts per million (ppm).

Those skilled in this field will appreciate that a wide variety of foods are suitable for frying or other preparation in the frying media of this invention. For example, potato chips are prepared by frying potato slices in the media. Other foods which may be prepared in these frying media include popcorn, vegetable pieces, meats, fish portions and fried dough products including doughnuts. Indeed, it appears that any foods which are suitable for preparation in animal or vegetable fats are suitable for preparation in the present media.

The following Examples illustrate the present invention. The Examples provide useful illustrations of the invention, but are not intended to limit the scope of the invention or the patent claims which follow.

EXAMPLES

Example 1

Poly(dimethylsiloxane) (700 g, 35 cSt, Dow Corning Corporation) was weighed into a Presto Fry Baby electric deep fryer and heated to 180° C. Potato slices of uniform size were prepared by slicing potatoes to 0.095 inch thickness and cutting into circles with a 60 mm diameter cookie cutter. Slices were washed with water and blotted dry. Six slices provided 21–24 g potato for frying. Two batches of six slices each were fried in the hot poly(dimethylsiloxane) with considerable foaming. The maximum foam height occurred about 1 minute into the fry and then subsided. The maximum foam height was recorded and averaged for the two batches. Ten microlitres (0.01 g) soybean fatty acid (Witco Industrene 226 FG) were added to the hot oil and two more batches were fried, recording the foam height each time. Frying was repeated with consecutive fatty acid additions of 0.1 mL (0.09 g), 0.7 mL (0.63 g), and 3.5 mL (3.02 g) into the hot oil. Results are recorded in the table below. Minimum foaming occurred with the addition of 140 ppm soybean fatty acids. Smoking was observed at the highest additive level (0.5%).

Effect of Soybean Fatty Acid Additive on Foam Height in PDMS-35

| total mg added | conc (ppm) | foam height (cm) | foam vol. (cc) | % reduction |
|---|---|---|---|---|
| 0 | 0 | 6.0 | 1132 | 0 |
| 10 | 14 | 4.2 | 793 | 30 |
| 100 | 143 | 3.7 | 698 | 38 |
| 730 | 1043 | 4.3 | 811 | 28 |
| 3750 | 5357 | 4.3 | 811 | 28 |

Example 2

Larger quantities of chips for taste panels were prepared in a Wells F-101 Fryer containing 15 kg of 35 cSt polydimethylsiloxane and 15–30g (0.1–0.2%) food grade soya fatty acid (Humko Industrene 226 FG). The panel judged the oil flavor to be somewhat stronger and the overall acceptability somewhat lower than commercially-available RUFFLES® brand potato chips.

Example 3

The following additional flavor-enhancing additives, all commercially available from the Grinsted Co., were evaluated for use in accordance with the present invention: Monoglycerides derived from sunflower oil (Dimodan LS, iodine value 110), partially hydrogenated soybean oil (Dimodan 0, iodine value 60), or lard (Dimodan S, iodine value 50); diacetyl tartrate ester of monoglycerides derived from lard (Panodan SD, iodine value of 80); polyglycerol ester (Triodan 20, iodine value of 80). Each of the additives are of GRAS status, and imparted good flavor and aroma associated with potato chips prepared in naturally occurring oils.

Foam height was measured in centimeters during the course of frying 19 to 21 g of potato slices in accordance with the general procedure of Example 1. Additive levels of approximately 10, 100, 200, or 1000 ppm were tested.

Monoglycerides (Dimodan LS, Of or S) were the least effective defoamers. Only 10% foam reduction was found at 100 ppm addition. Foaming was promoted at 10 and 1000 ppm. Dimodan LS and other more saturated Dimodans (O,S) were ineffective defoamers at 200 ppm.

The diacetyl tartaric esters of monoglycerides, Panodan SD, gave about 20% foam reduction throughout the 10–1000 ppm range.

A polyglycerol ester, Triodan 20, gave no foam reduction at 10 ppm, but 20% or more reduction at concentrations over 100 ppm.

Although the present invention has been described in connection with certain preferred embodiments and specific examples, it is not so limited. Modification and variations will become apparent to those skilled in this field of food science and chemistry.

I claim:

1. A method of preparing a fried food product, comprising frying a food in a frying medium free from naturally-occurring animal and vegetable fats and oils and comprising poly(dimethylsiloxane) and a flavor-enhancing additive consisting essentially of a component, or a chemically-modified component, of a plant or animal fat or oil in an amount less than 5% by volume and effective to impart to the fried food product a flavor or aroma normally associated with a product fried in animal or vegetable fat or oil.

2. A method according to claim 1 wherein the flavor-enhancing component is a fatty acid or a food-grade emulsifying agent containing a fatty acid radical.

3. A method according to claim 1 wherein the flavor-enhancing component is a monoglyceride.

4. A method according to claim 1 wherein the flavor-enhancing component is a diglyceride.

5. A method according to claim 1 wherein the flavor-enhancing component is an acylated monoglyceride.

6. A method according to claim 1 wherein the flavor-enhancing component is a fatty acid ester.

7. A method according to claim 1 wherein the flavor-enhancing component consists essentially of one or more members of the group consisting of oleic acid, linoleic acid, glycerol monooleate, glycerol monolinoleate, glycerol monooleate diacetate, glycerol monolinoleate diacetate, glycerol oleate linoleate acetate, oleyl alcohol, linoleyl alcohol, and oleic and linoleic esters of polyglycerols.

8. A method according to claim 6 wherein the flavor-enhancing component is a fatty acid which is esterified with propylene glycol or sucrose.

9. A method according to claim 2 wherein the fatty acid is linoleic acid or oleic acid.

10. A method according to claim 1 wherein the cooking medium comprises less than about 1.0% v/v of the flavor-enhancing component.

11. A method according to claim 1 wherein the poly(dimethylsiloxane) has a viscosity of about 35 cSt.

12. A method according to claim 1 wherein the frying medium is comprised of less than about 0.1% v/v of the flavor-enhancing component.

13. A method for preparing a reduced-calorie food product comprising cooking a food product in a cooking medium free from naturally-occurring animal and vegetable fats and oils and comprising poly(dimethylsiloxane) fluid and an amount of a flavor-enhancing additive effective to impart to the product a flavor associated with frying in a naturally-occurring animal or vegetable fat or oil.

14. A method according to claim 13 wherein said amount is less than about 1.0% v/v.

15. A method according to claim 13 wherein said amount is less than about 0.1% v/v.

16. A method according to claim 13 wherein the flavor enhancing additive is selected from the group consisting of fatty acid, monoglyceride and diglyceride.

17. A method according to claim 13 wherein the flavor enhancing additive is selected from the group consisting of monoglyceride, diglyceride, acylated monoglyceride and fatty acid ester.

18. A method for preparing reduced-calorie potato chips comprising cooking potato slices in a cooking medium free from naturally-occurring animal and vegetable fats and oils and comprising poly(dimethylsiloxane) fluid and an amount of a flavor-enhancing additive effective to impart to the potato chips a flavor associated with potato chips prepared in a naturally-occurring animal or vegetable fat or oil.

19. A method according to claim 18 wherein the flavor-enhancing additive is selected from the group consisting of fatty acid, monoglyceride, diglyceride, acylated monoglyceride and fatty acid ester.

20. A method according to claim 19 wherein said amount is less than about 1% v/v.

21. A method according to claim 19 wherein said amount is less than about 0.1% v/v.

22. In a method for preparing a fried food product by frying a food in poly(dimethylsiloxane) fluid, the improvement comprising frying the food in a mixture free from naturally-occurring animal and vegetable fats and oils comprising poly(dimethylsiloxane) and about 1% v/v or less of a flavor enhancing additive selected from the group consisting of fatty acid, monoglyceride and diglyceride.

23. An edible food product prepared by frying a food in a frying medium free from naturally-occurring animal and vegetable fats and oils and comprising poly(dimethylsiloxane) fluid and an amount of a flavor enhancing additive effective to impart to the product a flavor associated with frying in a naturally-occurring animal or vegetable fat or oil.

24. A product according to claim 23 wherein the flavor-enhancing additive is selected from the group consisting of fatty acid, monoglyceride and diglyceride.

25. A frying medium comprising poly(dimethylsiloxane) and from about 0.0001 to about 1.0% v/v of a defoaming and flavoring additive selected from the group consisting of oleic acid, linoleic acid and food grade emulsifying agent containing an oleic or linoleic radical, wherein said medium is free form naturally-occurring animal and vegetable fats and oils.

26. A medium according to claim 25 wherein the viscosity of the poly(dimethylsiloxane) is about 35 cSt.

27. A medium according to claim 25 wherein the emulsifying agent is a monoglyceride or a diglyceride.

* * * * *